United States Patent [19]

Fujii et al.

[11] 4,242,229

[45] Dec. 30, 1980

[54] SOLID CATALYST COMPONENTS FOR POLYMERIZATION OF α-OLEFINS

[75] Inventors: Masaki Fujii; Shiro Goto; Hideo Sakurai, all of Yokkaichi, Japan

[73] Assignee: Mitsubishi Petrochemical Company, Limited, Tokyo, Japan

[21] Appl. No.: 24,675

[22] Filed: Mar. 28, 1979

[30] Foreign Application Priority Data

Apr. 6, 1978 [JP] Japan ................ 53/40544

[51] Int. Cl.³ ............................................. C08F 4/64
[52] U.S. Cl. ....................... 252/429 B; 526/125; 526/141; 526/142; 526/143
[58] Field of Search .................................. 252/429 B

[56] References Cited

U.S. PATENT DOCUMENTS

| | | | |
|---|---|---|---|
| 4,069,169 | 1/1978 | Toyoda et al. ............... | 252/429 B |
| 4,149,990 | 4/1979 | Giannini et al. ............. | 252/429 B |
| 4,156,063 | 5/1979 | Giannini et al. ............. | 252/429 B X |

*Primary Examiner*—Patrick Garvin
*Attorney, Agent, or Firm*—Robert E. Burns; Emmanuel J. Lobato; Bruce L. Adams

[57] ABSTRACT

A solid catalyst component for forming, in combination with an organoaluminium compound, a catalyst for polymerization of α-olefins is provided, whereby α-olefin polymers having high stereoregularity or stereospecificity are produced in a high yield. The catalyst component is a product of contact of materials consisting essentially of a halogen-containing magnesium compound, a nucleus-substituted or unsubstituted benzoate ester and a titanium compound, and satisfies the conditions that the solid catalyst component contains 0.5 to 3.5% by weight of titanium atoms, and the highest absorption peak in the infrared absorption spectrum of the catalyst component among the absorption peaks appearing in the wave-number range of 1560 $cm^{-1}$ to 1710 $cm^{-1}$ appears in the wave-number region of 1665 $cm^{-1}$ to 1710 $cm^{-1}$.

11 Claims, 5 Drawing Figures

SOLID CATALYST COMPONENTS FOR POLYMERIZATION OF α-OLEFINS

BACKGROUND OF THE INVENTION

1. Field of the Invention

This invention relates to a solid catalyst component for a catalyst which can produce stereoregular or stereospecific α-olefin polymers in a high yield. More particularly, this invention relates to a transition metal component for a Ziegler type catalyst which comprises a certain titanium compound supported on a halogen-containing magnesium compound.

2. Description of the Prior Art

It is known that a high-activity catalyst is obtained by using a certain titanium compound supported on a magnesium halide as a transition metal component which constitutes in combination with an organoaluminium compound a Ziegler type catalyst for polymerization of α-olefins (e.g., as disclosed in U.K. Pat. Nos. 1,286,869 and 1,292,853. α-olefin polymers produced with such catalysts, however, have very low stereoregularity or stereospecificity.

In order to solve the problems concerning low stereoregularity of the polymers polymerized with a solid catalyst component comprising such a supported titanium compound, the introduction of a variety of electron-donor compounds into such solid catalyst components has been attempted. It has been recently found that the incorporation of benzoates into such catalyst components markedly enhances the stereo-regularity of the resulting α-olefin polymers and that the catalytic activity is not lowered (e.g., reference is made to German Laid-open Pat. No. 2,230,672. U.S. Pat. No. 4,107,415 and 4,069,169. To the best of the inventors' knowledge, however, it does not seem that the activity of the catalyst and the stereoregularity of the resulting polymer have been enhanced by the above-mentioned improvement to an extent such as to eliminate the steps of removing catalyst residues from polymers and extracting atactic polymers. The benzoates are benzoate esters.

SUMMARY OF THE INVENTION

The main object of the present invention is to solve the above described problems encountered in the prior art. The other objects will be made clear in the following description. These objects of the invention can be achieved by providing a specific supported titanium catalyst component of which the titanium content and the infrared-absorption spectral characteristic are restricted according to the present invention.

The solid catalyst component of the present invention which is to form, in combination with an organoaluminium compound, a catalyst for polymerization of α-olefins is a product of contact of materials consisting essentially of the following materials (1), (2) and (3) and satisfying the following conditions (A) and (B).

Materials (1) a halogen-containing magnesium compound,
(2) a nucleus-substituted or unsubstituted benzoate ester, and
(3) a titanium compound.

Conditions (A) The titanium content is in the range of 0.5 to 3.5% by weight (% of titanium atoms by weight on the basis of the weight of the solid component).

(B) In the infrared absorption spectrum of the solid catalyst component, the highest absorption peak among the absorption peaks appearing in the wave-number region of 1560 cm$^{-1}$ to 1710 cm$^{-1}$ appears in the wave-number region of 1665 cm$^{-1}$ to 1710 cm$^{-1}$.

The Ziegler type catalyst comprising the solid catalyst component of the present invention and an organoaluminium compound in combination therewith can produce in a high yield α-olefin polymers having high stereoregularity. Such effects are considered to result from the properties of the solid catalyst component and especially from the infrared-absorption spectral characteristic described above.

Solid catalyst components containing the above-mentioned materials (1), (2), and (3) have been known in the art. The infrared (IR) absorption spectra of such catalyst components display two or three absorption peaks in the wave-number range of 1560 to 1710 cm$^{-1}$. These absorption peaks are the peaks caused by the carbonyl group of the benzoate ester in the catalyst component. When the benzoate ester exists in the form of free molecules, the ester in nature displays one absorption peak in the range of 1700 to 1730 cm$^{-1}$. The above-mentioned two or three absorption peaks are assumed to result from shifts of the peak by the interaction between the benzoate ester and the other materials in the solid catalyst component although the present invention should not be restricted by such assumption.

According to the present inventors' findings, the presence of the highest peak in the range of 1665 to 1710 cm$^{-1}$ of these absorption peaks is directly related to the catalytic action of stereo-regular polymerization. The solid catalyst component having the highest absorption peak in the wave-number range of 1665 to 1710 cm$^{-1}$ can be prepared from the above listed materials (1), (2), and (3) under controlled conditions by controlling accordingly the state of the interaction among the components. When α-olefins were polymerized with the present solid catalyst component having such absorption properties, it was found that the stereo-regularity and yield of the resulting α-olefins were markedly enhanced in comparison with the polymerization with conventional solid catalyst components having the maximum absorption peaks in the wavenumber range of 1560 to 1664 cm$^{-1}$. Within this wavenumber region of 1665 to 1710 cm$^{-1}$, it has also been found that the stereoregularity of the resulting polymer becomes higher as the maximum absorption peak of the catalyst component moves to the higher wavenumber region.

In the solid catalyst component comprising the materials (1), (2), and (3), the structure of the chemical species having infrared absorption properties in the region of the higher wave numbers has not been clear. Although the solid catalyst component of the present invention and the above-mentioned conventional solid catalyst component may comprise the same materials (1)-(3), the former component differs in its physical properties from the latter component prepared by a conventional method. This difference should be considered to reflect the difference in their chemical structures. Moreover, the catalytic action of polymerization markedly differs between these two components. Therefore, the solid catalyst component of the present invention should be deemed to be a chemical substance different from the conventional catalyst component.

Incidentally, in the solid catalyst component, the above-mentioned materials (1), (2), and (3) may give rise to interaction or reaction and each material does not necessarily exist in its original form in the solid catalyst component. In the present invention, however, the solid catalyst component is sometimes referred to, for the sake of convenience, as "comprising" or "consisting essentially of" the above-mentioned materials (1), (2), and (3) with respect to its starting materials.

DESCRIPTION OF THE DRAWINGS

In the drawings.

| FIGS. | Examples | Controls | Reference Example |
|---|---|---|---|
| 1 | 1 | | |
| 2a | 1 | | |
| b | 2 | | |
| c | 3 | | |
| d | 4 | | |
| e | | 1 | |
| f | 5 | | |
| g | | 2 | |
| h | 6 | | |
| i | | 3 | |
| 3 | | | 1 |
| 4a | | 4 | |
| b | | 4 | |

DETAILED DESCRIPTION OF THE INVENTION

The solid catalyst component of the present invention is a product of contact of materials consisting essentially of the following materials (1), (2), and (3).

1. Halogen-containing magnesium compound, material (1)

The magnesium compounds can be classified into the following three groups.

(1) Magnesium halides

Magnesium halides are the most representative for use in the present invention. For example, magnesium fluoride, chloride, bromide and iodide are generally employed, and magnesium chloride is a representative halide.

These magnesium halides are desirably substantially anhydrous. It is preferable that their surface area be not lower than 1 m²/g and their particle size be not larger than 200μ.

(2) Magnesium hydroxyhalides

Magnesium hydroxyhalides are compounds each represented by the general formula $Mg(OH)_nX_{2-n}$ wherein X is a halogen and n stands for a number defined by $0<n<2$, which include for example magnesium hydroxychloride, magnesium hydroxybromide, and the like.

It is desirable that these magnesium compounds also be substantially anhydrous and have relatively large surface area or relatively small particle size.

(3) Interaction products between magnesium hydroxyhalides and organoaluminum compounds The interaction products are the products obtained by treating the magnesium compounds of the above-mentioned general formula $Mg(OH)_nX_{2-n}$ with organoaluminum compounds in accordance with the methods disclosed in the specifications of Japanese laid open Pat. application Nos. 134,888/1978 94,591/1979.

2. Nucleus-substituted or unsubstituted benzoate ester, material (2)

The benzoate esters (hereinafter referred to as "benzoate") are represented by the following general formula 1.

(1)

wherein: (1) $R^1$ stands for a saturated hydrocarbon residue having 1 to 8 carbon atoms, especially, an alkyl group, (2) $R^2$ is selected from the group consisting of hydrogen; a saturated hydrocarbon residue having 1 to 6 carbon atoms, especially, an alkyl group; an $R^3O$ group wherein $R^3$ is a saturated hydrocarbon residue, especially an alkyl group having 1 to 6 carbon atoms; nitro group; and a halogen, in which hydrogen is most suitable as $R^2$, and (3) n is 1 or 2.

Typical examples of the benzoate esters represented by the above-mentioned formula include methyl benzoate, ethyl benzoate, butyl benzoate, hexyl benzoate, amyl benzoate, cyclohexyl benzoate, 2-ethylhexyl benzoate, ethyl anisate, ethyl o-methoxybenzoate, ethyl p-toluylate, ethyl p-chlorobenzoate, methyl o-iodobenzoate, ethyl dichlorobenzoate, and ethyl p-nitrobenzoate.

These benzoate esters, when incorporated into the solid catalyst component, are not required to be in the form of the esters and can be produced in situ in the solid catalyst component. For example, the halogen-containing magnesium compound is treated with an alcohol to form an alcohol adduct thereof, and the ester can be formed by treating the alcohol adduct with the acid halide corresponding to the ester in any of post-treatment steps. Alternatively, the ester can be formed by treating the halogen-containing magnesium compound with an ether instead of an alcohol and then treating the resulting compound with the acid halide corresponding to the ester. In this case, the ester-forming reaction is preferably carried out in the presence of a Lewis acid so as to cause the reaction to proceed smoothly. A suitable example of such Lewis acids is $TiCl_4$.

B 3. Titanium compound, material (3) Titanium compounds usable as the transition metal components of Ziegler type catalysts can be generally employed in the present invention. These titanium compounds may be classified into two groups depending on their states.

(1) Solid titanium compounds

The solid compounds are tri- or divalent titanium compounds. Specific examples thereof are titanium trichloride (reduced with hydrogen, metallic titanium, metallic aluminium, an organometal compound or a metal hydride), titanium tribromide, titanium oxychloride, and titanium dichloride.

(2) Titanium compounds in the form of liquid, solution, or suspension (a) Halides of tetravalent titanium These titanium compounds are liquid in nature and include, for example, titanium tetrachloride, titanium tetrabromide and the like.

(b) Titanium compounds in the form of solution or suspension

The solution or suspension is obtained by dissolving or suspending the above-mentioned solid titannium compound in a halogenated hydrocarbon such as 1,2-dichloroethane, butyl chloride, cyclohexyl chloride and chlorobenzene in the presence of a halogen-containing inorganic compound selected from a halogen such as $Cl_2$ and $Br_2$, an interhalogen compound such as ICl, $ICl_3$, BrCl and IBr, and a halide or oxyhalide of phosphorous or sulphur such as $PCl_3$, $PCl_5$, $POCl_3$, $S_2Cl_2$, $SCl_2$, and $SOCl_2$.

Especially, titanium tetrachloride is most suitable among these titanium compounds.

4. Preparation of the solid catalyst compound (1) General description

The solid catalyst component of the present invention is prepared by the process comprising the steps of contacting or reacting the three materials, that is, the above-mentioned halogen-containing compound (material (1)), benzoate (material (2)) and titanium compound (material (3)), and the step of subjecting the resulting product (if necessary, followed by an additional treatment) to a washing treatment.

The improvement in the properties which are displayed in the above-described IR absorption spectral properties can be readily attained by selecting the proper operating conditions on either or both of the above-mentioned contacting step and post-treatment step.

Generally speaking, the preferred conditions for the operation in the contacting step depend mainly on the magnitude of energy applied from outside upon contacting the materials. When the contacting is carried out, for example, in a ball mill, the preferred conditions depend upon the amplitude of vibration and frequency of vibration, the size and number of balls used in the mill, the milling quantity, the temperature and duration of the milling, and the like.

Satisfactory results are not obtained when the applied energy controlled by these factors is excessive or deficient. More specifically, when too much energy is imparted, the reaction proceeds in a manner such that the absorption peak appears in the wave-number region of 1560 to 1664 cm$^{-1}$, and the performance of the resulting catalyst is not enhanced. On the other hand, when the applied energy is too little, the reaction does not proceed satisfactorily, and the reactants remain unreacted. To date, a common measure of the magnitude of energy to be applied through the respective operation factors has not been found. Thus, it is necessary to determine the magnitude of energy empirically with respect to the respective operation systems. It should be noted that, when the absorption peak is in the range of 1665 to 1710 cm$^{-1}$ by application of any operation factor, the catalytic performance of the resulting solid catalyst component is markedly higher than that of the catalyst component which has been prepared in a manner such that the absorption peak appears in the wave-number range of 1560 to 1664 cm$^{-1}$ without proper application of such operations.

On the other hand, the post-treatment following the contacting treatment can also be carried out so that the maximum absorption peak of the IR absorption spectrum appearing in the range of 1560 to 1710 cm$^{-1}$ will be exhibited in a higher wave-number region. Thus, even when the absorption peak of the contacted product appears in the range of 1560 to 1664 cm$^{-1}$, the operation factors of the post-treatment can be suitably selected as detailed in the following description, and the performance of the resulting solid catalyst component is markedly enhanced in comparison with that of the catalyst component whose spectroscopic properties were not improved accordingly.

Moreover, in the case where the product of the contacting treatment step has the maximum absorption peak in the range of 1665 to 1710 cm$^{-1}$, an even more desirable performance of the resulting catalyst component can be achieved by a post-treatment wherein the maximum peak is moved to a higher wave-number region. In any case, the effects obtained in the post-treatment step do not depend on the types of its operation factors, as in the case of the contacting treatment step. In other words, it is not so important what method of treatment is employed. What is of importance is that the resulting solid catalyst component has the maximum absorption peak in the range of generally 1665 to 1710 cm$^{-1}$, preferably 1670 to 1710 cm$^{-1}$, and most preferably 1675 to 1705 cm$^{-1}$.

(2) Methods for preparation of the solid catalyst component

Specific methods for preparation of the solid catalyst component are given below on the basis of the above-described principles.

(i) The step of contacting the halogen-containing magnesium compound (material (1)), the nucleus-substituted or unsubstituted benzoate (material (2)) and the titanium compound (material (3))

These three materials can be contacted by any suitable known method, some of the typical methods being enumerated below.

(a) Method of contacting the halogen-containing magnesium compound with the benzoate and then contacting the mixture with the titanium compound.

There are two methods of contacting the halogen-containing magnesium compound with the benzoate. One is the method of mixing them in the presence or absence of an inert or non-active hydrocarbon such as hexane, heptane, benzene, toluene and cyclohexane, or an inert or non-active halogenated hydrocarbon such as carbon tetrachloride and 1,2-dichloroethane (hereinafter referred to as mixing contact method). The other is the method of contacting them by milling by means of a rotary ball mill, a vibrating ball mill, an impact mill or the like, in the presence or absence of the above-mentioned inert solvent (hereinafter referred to as milling contact method). Either of these methods may be used.

The mixing ratio by weight of the halogen-containing magnesium compound to the benzoate is in the range of preferably 1:(0.01 to 10) and more preferably 1:(0.1 to 1). The contacting temperature, as the temperature outside of the mill, is in the range of generally minus 50° to plus 150° C. and preferably minus 20° to plus 80° C. The period of time for contacting is not especially restricted, but may be in the range of generally several minutes to hundreds of hours and preferably 30 minutes to 200 hours.

The resulting contacted product of the halogen-containing magnesium compound and benzoate can be contacted with the titanium compound in the same way as in the method of contacting the halogen-containing magnesium compound with the benzoate. The weight ratio of the contacted product of the magnesium compound and the benzoate to the titanium compound can be in the range of 1:(0.01 to 1000) and is preferably in the range of 1:(0.1 to 100). The temperature for this contacting step is generally in the range of 0° to 150° C., preferably in the range of 20° to 140° C. for the mixing contact method and 0° to 80° C. for the milling contact method. The period of time for this contacting step is generally in the range of several minutes to hundreds of hours, and is preferably in the range of 10 minutes to 100 hours for the mixing contact method and 30 minutes to 200 hours for the milling contact method.

(b) Method of contacting the halogen-containing magnesium compound with the titanium compound and then contacting the mixture with benzoate The halogen-containing magnesium compound is contacted with the titanium compound by a mechanical contact which preferably accompanies a milling step. The weight ratio of the halogen-containing magnesium compound to the titanium compound is generally in the range of 1:(0.01 to 5) and preferably in the range of 1:(0.1 to 1). The temperature for the milling as the temperature outside of the mill pot is generally in the range of minus 50° to plus 150° C. and preferably in the range of minus 20° to plus 80° C. The period of time for the milling is in the range of generally 10 minutes to 500 hours and preferably 30 minutes to 200 hours.

The resulting contacted product of the halogen-containing magnesium compound and the titanium compound is then contacted with the benzoate ester by the mixing contact or milling contact method in the presence or absence of an inert diluent. The conditions for the contacting operations are substantially the same as those for contacting the halogen-containing magnesium compound with the benzoate given in the above described method (a).

(c) Method of contacting the benzoate with the titanium compound and then contacting the mixture with the halogen-containing magnesium compound Such methods of contacting the materials are also possible if so desired. The specific conditions for the operations may be established similarly as in the above described methods (a) and (b).

(ii) The post-treatment after the materials (1)–(3) are contacted

The resulting product obtained by contacting the halogen-containing magnesium compound, benzoate and titanium compound by any of the above described methods may be used without any further treatment as a solid catalyst component for the polymerization in the case where the product has the desired IR spectral properties, but, in this case, the stereo-regularity of the contacted product may be further enhanced by washing the product with the inert solvents described below.

When the contacted product does not possess the required IR spectral properties, the post-treatment of the product is indispensable to the present invention. In the present invention, it is essential that the titanium content in the solid catalyst component, that is, the proportion of supported titanium, be within a specific range. The presence of the unsupported titanium compound which is mere adhering to the solid catalyst component (removable by washing) is detrimental to the objects of the present invention. Thus, it is often necessary to carry out washing treatment in order to satisfy the requirements of the present invention with respect to the titanium content. The titanium content as titanium atoms in the solid catalyst component is in the range of generally 0.5 to 3.5% by weight, preferably 0.7 to 3.0% by weight, and most preferably 1.0 to 2.5% by weight. These titanium contents may preferably be those based on the titanium compounds which are not removable by washing with an inert hydrocarbon.

Washing with an inert solvent

The soluble matters in the solid contacted product are removed by suspending in an inert solvent, the contacted product comprising the halogen-containing magnesium compound, benzoate, and titanium compound. This step is followed by filtration or decantation. The temperature for suspending the contacted product in an inert solvent is preferably in the range of 0° C. to the boiling point of the inert solvent. The period of time for the suspension is not especially restricted, but is preferably in the range of 1 minute to 10 hours. The ratio of the solid to the solvent is generally in the range of 10 g of the solid to from 5 to 1000 ml of the solvent. The steps of suspension and filtration or decantation can be suitably repeated, and are generally repeated 1 to 100 times.

The inert solvents to be used in the washing operation include the following.

(a) Saturated hydrocarbons

Aliphatic hydrocarbons such as pentane, hexane, heptane, octane, etc., and alicyclic hydrocarbons such as cyclopentane, cyclohexane, methylcyclohexane, etc.

(b) Aromatic hydrocarbons

For example, benzene, toluene, xylene, and ethylbenzene.

(c) Halogenated hydrocarbons

These can be selected from the halogenated hydrocarbons enumerated above as solvents for dissolving or suspending the solid titanium compounds.

5. The resulting solid catalyst components

The solid catalyst component of the present invention is distinguished from the conventional solid catalyst components composed of the same materials (1), (2) and (3), by the content of titanium and the IR spectral properties.

The titanium content is determined by decomposing the solid catalyst component with a dilute sulfuric acid, then developing the decomposed solution with hydrogen peroxide, and then by colorimetry using visible rays of 410 microns.

The IR spectrum is determined by using a solid catalyst component mixed with nujol in a nitrogen atmosphere as a sample by means of the model IRA-1 infrared spectrometer supplied by Nippon Bunkosha, Japan.

6. Polymerization of α-olefins (1) Formation of the catalyst

The solid catalyst component thus obtained is combined with an organoaluminum compound which is the other component (sometimes called a co-catalyst) of the Ziegler catalysts, to form or make-up a catalyst for polymerization of α-olefins.

Suitable organoaluminum compounds may be selected from those which can be used as components of the Ziegler catalysts. A typical type of these compounds is a compound represented by a formula $AlR_mX'_{3-m}$, wherein R is hydrogen or a hydrocarbon residue having 1 to 10 carbon atoms (especially an alkyl group, an aralkyl group or an aryl group), X' is a halogen (especially chlorine, bromine or iodine) or an alkoxy group having 1 to 12 carbon atoms, and m is a number defined by $1 \leq m \leq 3$. For example, the compounds represented by the formula include (a) triethylaluminum, tri-n-propylaluminum, tri(2-methylpentyl) aluminum, tri-n-octylaluminum; (b) diethylaluminum monochloride, diethylaluminum iodide, diisobutylaluminum monochloride, ethylaluminum sesquichloride, ethylaluminum dichloride; and (c) diisobutylaluminum hydride; (d) diethylaluminum ethoxide. A mixture of any of these compounds can also be used, and in this case the number "m" of the general formula is not an integer but a decimal (for example, m=2.5).

The molar ratio of the organoaluminum compound (II) to be used to the titanium atoms (I) of the solid catalyst component is generally in the range of (1 to 1000):1 and preferably in the range of (5 to 500) :1 (as a molar ratio of (II):(I)).

(2) α-olefins

The α-olefins which are polymerized with the catalyst system of the present invention are represented by the formula R—CH=CH$_2$, wherein R is hydrogen or a hydrocarbon residue having 1 to 10 carbon atoms which may be substituted or unsubstituted. For example, the α-olefins include ethylene, propylene, butene-1, pentene-1, hexene-1, and 4-methyl-pentene-1. Ethylene and propylene are preferred, and propylene is especially preferred in the present invention.

A mixture of any of these α-olefins can be used. For example, in the case of polymerization of propylene, up to 20% by weight of propylene of the above-mentioned α-olefin such as ethylene can be copolymerized with propylene. Copolymerization with a copolymerizable monomer other than the above-mentioned α-olefins such as e.g., vinyl acetate, diolefins can also be carried out.

(3) Process for polymerization

The catalyst system of the present invention can be used in an ordinary slurry-phase polymerization, in a liquid-phase non-solvent polymerization, a gas-phase polymerization employing substantially no solvent, and in a polymerization system employing a prepolymerization step, irrespective of whether the polymerization system is continuous or whether it is of batch-type. As the polymerization solvent for slurry-phase polymerization, saturated aliphatic hydrocarbons or aromatic hydrocarbons such as hexane, pentane, cyclohexane, benzene and toluene, or mixtures thereof can be employed.

In the polymerization, an electron donor such as methyl methacrylate or ethyl benzoate can also be added in a small amount to the polymerization system.

The temperature for the polymerization is generally in the range of room temperature to about 200° C. and preferably in the range of 50° to 150° C. Hydrogen can be used auxiliarily as a molecular weight modifier.

The present invention is further described by way of the following examples. It should be understood, however, that the present invention is not intended to be restricted by these examples.

EXAMPLE 1

1. Preparation of solid catalyst component

Into a vibrating mill pot made of SUS 316 (stainless steel, JIS designation), 800 ml in capacity, type No. 6 supplied by Shirai Stainless Kogyo K.K., Japan, 20.0 g of anhydrous magnesium chloride and 6.0 ml of ethyl benzoate were charged under a nitrogen atmosphere. The pot was supplied with 300 balls made of SUS 316, 12 mm in diameter. The vibrating mill was set to a total amplitude of vibration of 8.0 mm and a vibration frequency of 1200 vibrations/minute. Milling was carried out with the vibrating mill for 24 hours, while the temperature inside the pot was maintained at about 20° C. by cooling the pot with water. Then 6.0 ml of ethyl benzoate was added thereto.

The resulting mixture was subjected to milling for 24 hours by cooling the pot in the above described manner to obtain a co-milled solid material. 9.3 ml of titanium tetrachloride was further added, and the resulting mixture was subjected to milling for 24 hours by cooling the pot in the above described manner. Ten (10.0) grams of the resulting milled solid material was placed in a flask of 200-ml capacity, and 100 ml of 1,2-dichloroethane was added thereto. The flask was placed in an oil bath, and the mixture was refluxed for 2 hours by heating the bath. The resulting mixture was repeatedly washed with dehydrated n-hexane at room temperature to obtain a solid catalyst component of the present invention. In this solid component, 18.5 mg of titanium atoms per 1 g of the solid was supported.

2. Measurement of infrared absorption spectra

Figure 1:
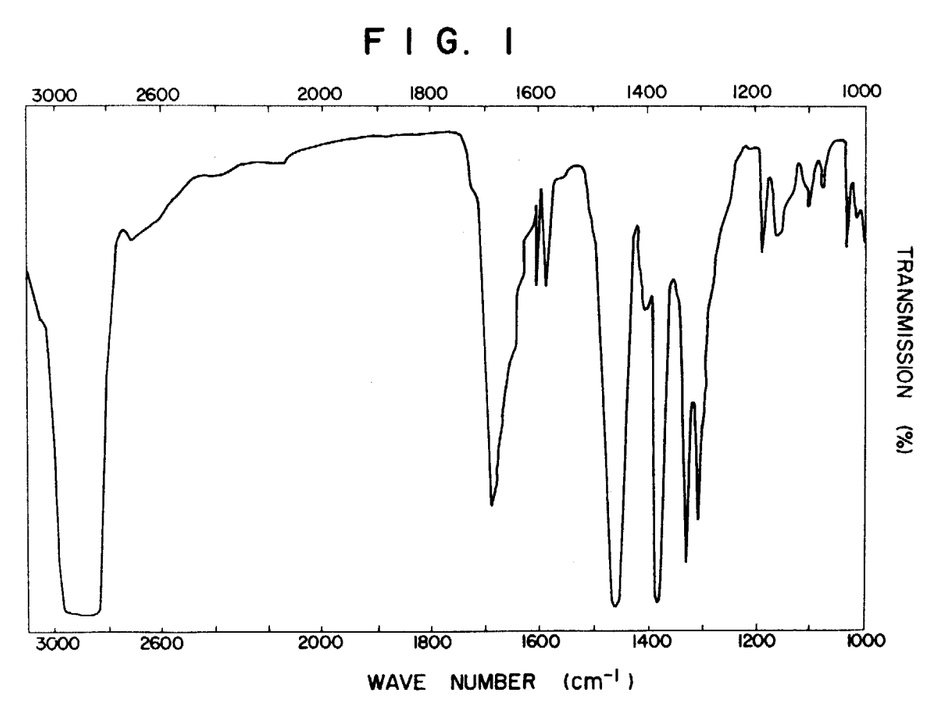
FIGS. 1, 2a-2i, 3 and 4a-4b are facsimile graphs showing the infrared absorption spectra of solid catalyst components and free ethyl benzoate. The Figures correspond to the Examples and Controls given hereinafter as follows.
Figure 2:
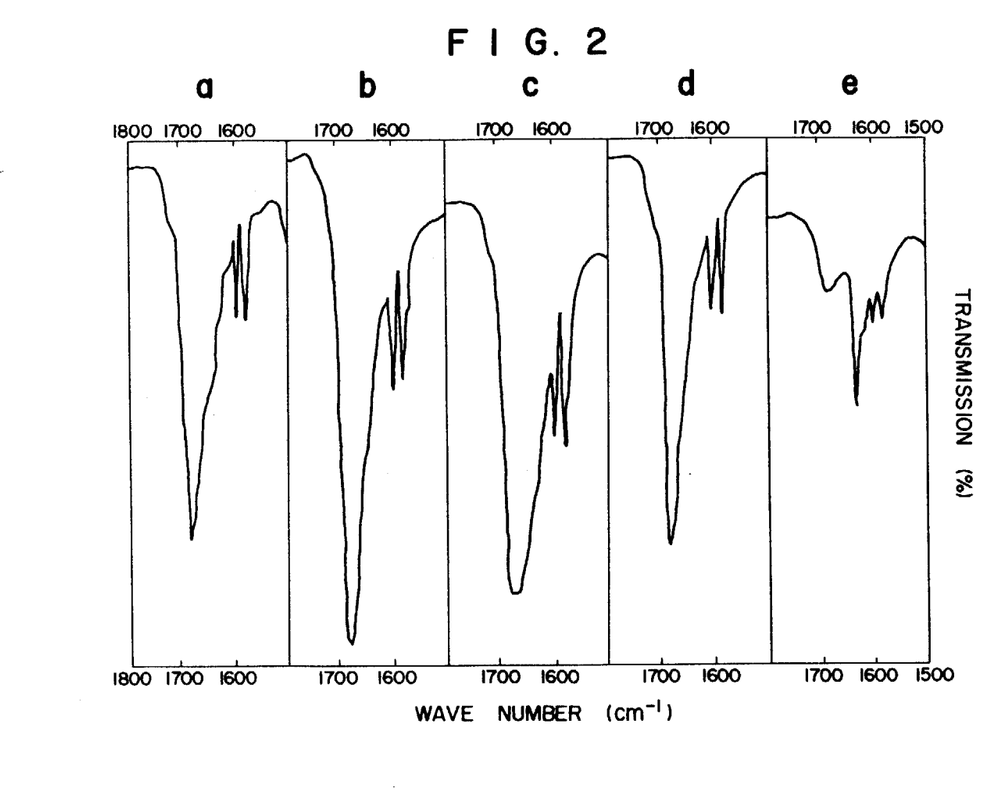

The IR absorption spectrum of the resulting solid catalyst component was determined in accordance with the nujol by means of an infrared spectrometer, model IRA-1 supplied by Nippon Bunkosha, Japan. The resulting spectra are shown in FIGS. 1 and 2a, wherein FIG. 2a shows a region at the wave-number of 1500 to 1800 cm$^{-1}$ of the spectrum shown in FIG. 1. It is to be noted that the maximum peak of the spectrum in the range of 1560 to 1710 cm$^{-1}$ appears at 1680 cm$^{-1}$.

3. Polymerization of propylene

Air contained in an autoclave of 2-liter capacity with a stirrer was completely replaced with propylene gas, and then 14.2 mg of triethyl aluminum and 27.0 mg of the solid catalyst component (corresponding to 0.50 mg of Ti atoms) were introduced into the autoclave. The autoclave was further charged with 1.4 liters of liquid propylene at room temperature, and heating thereof was started 10 minutes later. The resulting reaction was continued at 60° C. for 1 hour to obtain 273 g of a polymer. The catalytic activity was thus such that the yield of the polymer per 1 g of the solid catalyst was 10.1 kg polymer/g solid, and the yield per 1 g of titanium atoms was 546 kg polymer/g Ti. The quantity of the polymer not extracted with boiling heptane was 95.1% by weight.

EXAMPLE 2

1. Preparation of solid catalyst component

A solid catalyst component was prepared under the conditions set forth in Example 1 except that the total amplitude of vibration of the vibrating mill was set at 4.0 mm, and the pot was not cooled with water. In this experiment, the temperature inside the pot was about 40° C. In the resulting solid catalyst component, 16.9 mg of titanium atoms per 1 g of the solid was supported.

2. Measurement of IR absorption spectrum

The spectrum was determined in the same way as in Example 1 and is shown in FIG. 2b. The maximum peak in the range of 1560 to 1710 cm$^{-1}$ appeared at 1690 cm$^{-1}$.

3. Polymerization of propylene

Propylene was polymerized in the same way as in Example 1 except that 29.6 mg of the solid catalyst component (corresponding to 0.50 mg of titanium atoms) was used, to obtain 292 g of the resulting polymer. The catalytic activity was thus such that the yield of polymer per 1 g of the solid catalyst component was 9.86 kg polymer/g solid, and the yield per 1 g of titanium atoms was 584 kg polymer/g titanium. The quantity of the polymer not extracted with boiling heptane was 95.5% by weight.

EXAMPLE 3

1. Preparation of solid catalyst component

A solid catalyst component was prepared under the conditions set forth in Example 1 except that the frequency of vibration of the vibrating mill was set at 300 vibrations/minute by changing its gear ratio, and the pot was not cooled with water. The temperature inside the pot was finally about 30° C. In the resulting solid catalyst component 24.1 mg of titanium atoms per 1 g of the solid was supported.

2. Measurement of IR absorption spectrum

The spectrum was determined in the same way as in Example 1 and is shown in FIG. 2c. The maximum peak in the range of 1560 to 1710 cm$^{-1}$ appeared at 1690 cm$^{-1}$.

3. Polymerization of propylene

Propylene was polymerized in the same way as in Example 1, except that 20.7 mg of the solid catalyst component (corresponding to 0.50 mg of titanium atoms) was used, to obtaine 285 g of the resulting polymer. The catalytic activity was thus such that the yield of polymer per 1 g of the solid catalyst component was 13.8 kg polymer/g solid, and the yield per 1 g of titanium atoms was 570 kg polymer/g Ti. The quantity of the polymer not extracted with boiling heptane was 95.6% by weight.

EXAMPLE 4

1. Preparation of solid catalyst component

A solid catalyst component was prepared under the same conditions as in Example 1 except that 2,400 pieces of balls 6.3 mm in diameter, the total weight of the balls being substantially the same as in Example 1, were used, and the pot was not cooled with water. The temperature inside the pot was finally about 50° C. In the resulting solid catalyst component 2.43 mg of titanium atoms per 1 g of the solid was supported.

2. Measurement of IR absorption spectrum

The spectrum was determined in the same way as in Example 1 and is shown in FIG. 2d. The maximum peak in the range of 1560 to 1710 cm$^{-1}$ appeared at 1690 cm$^{-1}$.

3. Polymerization of propylene

Propylene was polymerized in the same way as in Example 1, except that 20.6 mg of the solid catalyst component (corresponding to 0.50 mg of titanium atoms) was used, to obtain 284 g of the resulting polymer. The catalytic activity was thus such that the yield of polymer per 1 g of the solid was 13.8 kg polymer/g solid, and the yield per 1 g of titanium atoms was 568 kg polymer/g Ti. The quantity of the polymer not extracted with boiling heptane was 95.3% by weight.

CONTROL 1

1. Preparation of solid catalyst component

A solid catalyst component was prepared under the same conditions as in Example 1 except that the pot of the vibrating mill was not cooled with water. The temperature inside the pot was finally about 90° C. In the resulting solid catalyst component 3.81 mg of titanium atoms per 1 g of the solid was supported.

2. Measurement of IR absorption spectrum

The spectrum was determined in the same way as in Example 1 and is shown in FIG. 2e. The maximum peak in the range of 1560 to 1710 cm$^{-1}$ appeared at 1640 cm$^{-1}$.

3. Polymerization of propylene

Propylene was polymerized under the same conditions as in Example 1, except that 21.7 mg of the solid catalyst component (corresponding to 0.83 mg of titanium atoms) was used, to obtain 315 g of the resulting polymer. The catalytic activity was thus such that the yield of polymer per 1 g of the solid was 14.5 kg polymer/g solid, and the yield per 1 g of titanium atoms was 380 kg polymer/g Ti. The quantity of the polymer not extracted with boiling heptane was 86.1% by weight.

Upon comparison of the results obtained in Examples 1 through 4, it is observed that the catalytic activity and the stereoregularity of the resulting polymer are markedly enhanced when the peak appearing at 1640 cm$^{-1}$ was decreased and the peak at 1690 cm$^{-1}$ was relatively increased.

EXAMPLE 5

1. Preparation of solid catalyst component

Into a 200 ml flask was charged 20.0 g of anhydrous magnesium chloride, to which 80.0 ml of 1,2-dichloroethane and 12.0 ml of ethyl benzoate were added. Reaction was carried out at 70° C. for 2 hours by heating in an oil bath. The resulting product was dried in a nitrogen stream to obtain a solid reaction product. The entire solid reaction product was placed in a vibrating mill pot made of SUS 316, 800 ml in capacity, containing a nitrogen atmosphere. The pot was supplied with 300 balls made of SUS 316, 12 mm in diameter, and 9.3 ml of titanium tetrachloride was further added thereto. Milling was carried out for 24 hours with the vibrating mill set to a total amplitude of vibration of 4.0 mm and a rotational speed of 1200 rpm.

Ten grams (10.0 g) of the resulting milled solid was placed in a 200-ml flask, and 100 ml of 1,2-dichloroethane solution of iodine trichloride (containing 0.20 g of iodine trichloride) was added thereto. The flask was placed in an oil bath, and the mixture was refluxed for 2 hours by heating the bath. The resulting mixture was repeatedly washed with dehydrated n-hexane at room temperature to obtain a solid component. In this solid catalyst component 15.6 mg of titanium atoms per 1 g of the solid was supported.

2. Measurement of IR absorption spectrum

The IR absorption spectrum of the resulting solid was determined in the same way as in Example 1 and is shown in FIG. 2f. The maximum peak in the range of 1560 to 1710 cm$^{-1}$ appeared at 1690 cm$^{-1}$.

3. Polymerization of propylene

Propylene was polymerized in the same way as in Example 1, except that 32.1 mg of the solid catalyst component (corresponding to 0.50 mg of titanium atoms) was used, to obtain 330 g of the resulting polymer. The catalytic activity was thus that the yield of polymer per 1 g of the solid catalyst was 10.3 kg polymer/g solid, and the yield per 1 g of titanium atoms was 660 kg polymer/g Ti. The quantity of the polymer not extracted with boiling heptane was 94.8% by weight.

CONTROL 2

1. Preparation of solid catalyst component

Into a 200 ml flask was placed 5.0 g of anhydrous magnesium chloride and 30.0 ml of ethyl benzoate. The flask was placed in an oil bath, and reaction was carried out at 200° C. for 10 hours by heating in the oil bath. The reaction product was washed with n-hexane to obtain a solid reaction product. To five grams (5.0 g) of the solid reaction product was added 20.0 ml of titanium tetrachloride, and the mixture was subjected to reaction at 60° C. The reaction product was allowed to cool to room temperature and was then washed thoroughly with n-hexane to obtain a solid catalyst component. In this solid catalyst component 6.2 mg of titanium atoms per 1 g of the solid was supported.

2. Measurement of IR absorption spectrum

The spectrum was determined in the same way as in Example 1 and is shown in FIG. 2g. Two absorptions having substantially the same absorption intensity appeared in the range of 1566 to 1710 cm$^{-1}$, the absorption peaks of which were at 1570 cm$^{-1}$ and 1605 cm$^{-1}$, respectively.

3. Polymerization of propylene

Propylene was polymerized under the same conditions as in Example 1, except that 80.7 mg of the solid catalyst component (corresponding to 0.50 mg of titanium atoms) was used, to obtain 9 g of the resulting polymer. The catalytic activity was thus such that the yield of polymer per 1 g of titanium atoms was 18 kg polymer/g Ti.

EXAMPLE 6

1. Preparation of solid catalyst component

In a vibrating mill pot made of SUS 316, of 800 ml capacity, were placed 20.0 g of anhydrous magnesium chloride and 6.0 ml of ethyl benzoate under a nitrogen atmosphere. The pot was supplied with 300 balls made of SUS 316, each 12 mm in diameter. The vibrating mill was set to a frequency of vibration of 1,200 vibrations/minute, and a maximum amplitude of vibration of 4 mm. Milling was carried out for 24 hours without cooling of the pot. Six (6.0) ml of ethyl benzoate was added to the mixture, and milling was continued for another 24 hours, whereupon solid materials containing magnesium were obtained.

Separately, 10.0 g of a titanium trichloride composition which had been prepared by reducing titanium tetrachloride with metallic aluminum and 2.0 g of iodine trichloride were added to 100.0 ml of 1,2-dichloroethane and then stirred at 30° to 35° C. Thus, a blackish-purple homogeneous solution was obtained. The pot was charged with 82 ml of the solution (containing 1.98 g of titanium atoms) together with 20.0 g of the solid materials containing magnesium which had previously been milled. The mixture was subjected to milling for 24 hours under the same condition as above.

The pot was then moved to a dry box and placed under a vacuum condition at room temperature for 3 hours to remove volatile substances consisting essentially of 1,2-dichloroethane. The resulting dry solid material was washed with dehydrated n-hexane to obtain a solid catalyst component. In this solid 23.2 mg of titanium atoms per 1 g of the solid was supported.

2. Measurement of IR absorption spectrum

The spectrum was determined in the same way as in Example 1 and is shown in FIG. 2h. The maximum peak in the range of 1560 to 1710 cm$^{-1}$ appeared at 1680 cm$^{-1}$.

3. Polymerization of propylene

Propylene was polymerized in the same way as in Example 1, except that 21.6 mg of the solid catalyst component (corresponding to 0.50 mg of titanium atoms) and 20.0 mg of triethyl aluminum was used, to obtain 273 g of a polymer. The catalytic activity was thus such that the yield of polymer per 1 g of the solid catalyst was 12.6 kg polymer/g solid, and the yield per 1 g of titanium atoms was 574 kg polymer/g Ti. The quantity of the polymer not extracted with boiling heptane was 95.2% by weight.

CONTROL 3

1. Preparation of solid catalyst component

A solid catalyst component was prepared in the same way as in Example 6 except that 56 ml of the following titanium trichloride suspension (containing 1.35 g of titanium atoms) was used instead of the homogeneous solution comprising titanium trichloride, iodine trichloride and 1,2-dichloroethane. The above mentioned titanium trichloride suspension was prepared by suspending, in 100.0 ml of 1,2-dichloroethane, 10.0 g of a titanium trichloride composition obtained by reduction of titanium tetrachloride with metallic aluminum (wherein titanium trichloride is substantially insoluble in 1,2-dichloroethane). A solid catalyst component was thus obtained. In 1 g of the resulting solid 63 mg of titanium atoms was supported.

2. Measurement of IR absorption spectrum

The spectrum was determined in the same way as in Example 1 and is shown in FIG. 2i. Two absorptions having substantially the same absorption intensity appeared in the range of 1560 to 1710 cm$^{-1}$, the peaks of which were at 1600 cm$^{-1}$ and 1660 cm$^{-1}$, respectively.

3. Polymerization of propylene

Propylene was polymerized under the same conditions as in Example 5, except that 7.9 mg of the solid catalyst component (corresponding to 0.50 mg of titanium atoms) was used, to obtain 58.6 g of the resulting polymer. The catalyst activity was thus such that the yield of polymer per 1 g of the solid catalyst was 7.42 kg polymer/g solid, and the yield per 1 g of titanium atoms was 117 kg polymer/g Ti. The quantity of the polymer not extracted with boiling heptane was 72.4% by weight.

Upon comparison of these results with those of Example 6, it is observed that the catalytic activity and the stereoregularity of the resulting polymer were markedly improved when the peaks at 1600 cm$^{-1}$ and 1660 cm$^{-1}$ disappeared and the peak at 1680 cm$^{-1}$ appeared.

REFERENCE EXAMPLE 1

Figure 3:
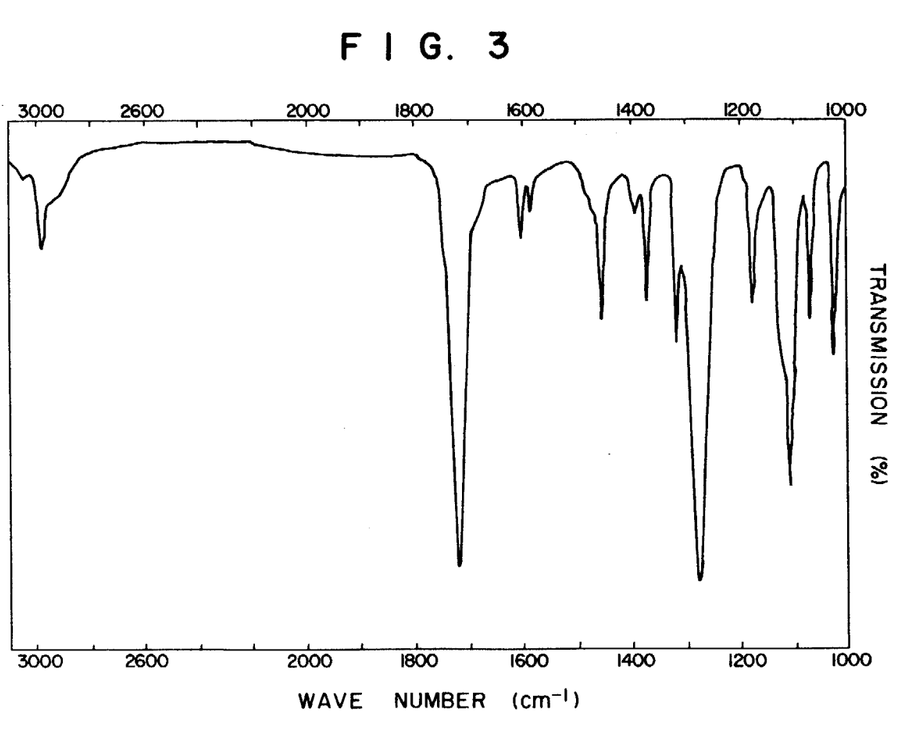

Ethyl benzoate was coated with a thickness of 0.1 mm on a sodium chloride plate. The IR absorption spectrum was measured by means of the above-described infrared spectrometer. The resulting spectrum is shown in FIG. 3.

CONTROL 4

1. Preparation of solid catalyst component

Into a vibrating mill pot made of SUS 316 (stainless steel, JIS designation), 800 ml in capacity, type No. 6 supplied by Shirai Stainless Kogyo K.K., Japan, 20.0 g of anhydrous magnesium chloride and 6.0 ml of ethyl benzoate were charged under a nitrogen atmosphere. The pot was supplied with 300 balls made of SUS 316, 12 mm in diameter. The vibrating mill was set to a total amplitude of vibration of 8.0 mm and a vibration frequency of 1200 vibrations/minute. Milling was carried out with the vibrating mill for 24 hours, while the temperature inside the pot was maintained at about 20° C. by cooling the pot with water. Then 6.0 ml of ethyl benzoate was added thereto.

The resulting mixture was subjected to milling for 24 hours by cooling the pot in the above described manner to obtain a co-milled solid material (a). Part of this co-milled solid material (a) was taken out and IR spectrum thereof was measured. Subsequently, 9.3 ml of titanium tetrachloride was added, and the resulting mixture was subjected to milling for 24 hours without cooling of the pot. The final temperature inside the pot was approximately 90° C. Then (10) grams of the resulting milled solid material was placed in a flask of 200-ml capacity, and 100 ml of 1,1-dichloroethane was added thereto. The flask was placed in an oil bath, and the mixture was refluxed for 2 hours by heating the bath. The resulting mixture was repeatedly washed with dehydrated n-hexane at room temperature to obtain a solid catalyst component (b). In this solid component, 49.8 mg of titanium atoms per 1 g of the solid was supported.

2. Measurement of infrared absorption spectra

Figure 4:
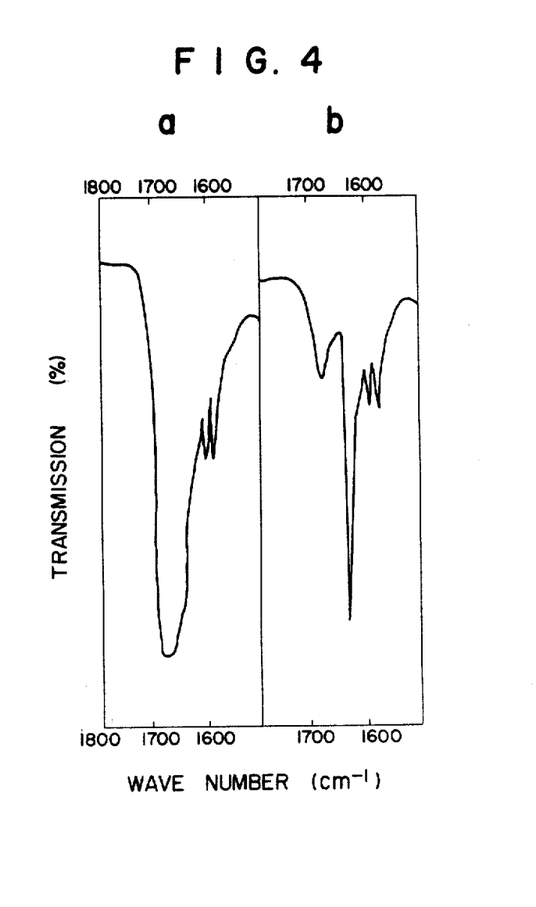

The IR absorption spectra of the resulting co-milled solid material (a) and solid catalyst component (b) were determined in accordance with the nujol by means of an infrared spectrometer, model IRA-1 supplied by Nippon Bunkosha, Japan. The resulting spectra are shown in FIGS. 4a and 4b. The maximum peak of the spectrum in the range of 1560 to 1710 cm$^{-1}$ shown in FIG. 4a appears at 1670 cm$^{-1}$. However, the maximum peak of the spectrum in the range of 1560 to 1710 cm$^{-1}$ shown in FIG. 4b appears at 1640 cm$^{-1}$.

3. Polymerization of propylene

Air contained in an autoclave of 2-liter capacity with a stirrer was completely replaced with propylene gas, and then 14.2 mg of triethyl aluminum and 10.0 mg of the solid catalyst component (corresponding to 0.50 mg of Ti atoms) were introduced into the autoclave. The autoclave was further charged with 1.4 liters of liquid propylene at room temperature, and heating thereof was started 10 minutes later. The resulting reaction was continued at 60° C. for 1 hour to obtain 146 g of a polymer. The catalytic activity was thus such that the yield of the polymer per 1 g of the solid catalyst was 14.5 kg polymer/g solid, and the yield per 1 g of titanium atoms was 292 kg polymer/g Ti. The quantity of the polymer not extracted with boiling heptane was 66.1% by weight. Upon comparison with the results obtained in Example 1, it is observed that the catalytic activity and the stereoregularity of the resulting polymer are drastically lowered when the peak of the spectrum of the carrier (co-milled solid material (a)) appearing at 1665 cm$^{-1}$ was shifted beyond this range due to the inadequate subsequent treatment.

What is claimed is:

1. A solid catalyst component for forming, in combination with an organoaluminum compound, a catalyst for polymerization of α-olefins, which solid catalyst component is a product of contact of materials consisting essentially of:
   (1) a, magnesium halide
   (2) a benzoate ester, of the formula wherein, R$^1$ denotes a saturated hydrocarbon residue having 1 to 8 carbon atoms; R$^2$ is selected from the group consisting of hydrogen, a saturated hydrocarbon residue having 1 to 6 carbon atoms, an R$^3$O group, wherein R$^3$ is a saturated hydrocarbon residue having 1 to 6 carbon atoms, nitro group, and a halogen and n is 1 or 2, and
   (3) a titanium halogen compound, and satisfies the conditions:
     (A) that the titanium content in the solid catalyst component is such that the content of titanium atoms in % by weight on the basis of the weight of the solid component is in the range of 0.5 to 3.5% by weight, and
     (B) that in the infrared absorption spectrum of the solid catalyst component, the highest absorption peak among the absorption peaks appearing in the wave-number region of 1560 cm$^{-1}$ to 1710 cm$^{-1}$ appears in the wave-number region of 1665 cm$^{-1}$ to 1710 cm$^{-1}$.

2. The catalyst component as set forth in claim 1, in which the highest absorption peak appears in the wave-number region of 1670 cm$^{-1}$ to 1710 cm$^{-1}$.

3. The catalyst component as set forth in claim 1, in which the highest absorption peak appears in the wave-number region of 1675 cm$^{-1}$ to 1705 cm$^{-1}$.

4. The catalyst component as set forth in claim 1, in which the titanium content is 0.7 to 3.0% by weight.

5. The catalyst component as set forth in claim 1, in which the titanium content is 1.0 to 2.5% by weight.

6. The catalyst component as set forth in claim 1, in which the ratio by weight of the halogen-containing magnesium compound to the benzoate ester to the titanium compound is in the range of 1:(0.01 to 10):(0.01 to 5).

7. The catalyst component as set forth in claim 1, in which the titanium compound is selected from the group consisting of solid halogen compounds of tri- or divalent titanium, halides of tetravalent titanium, and the tri- or divalent halogen compounds in the form of solutions or suspensions.

8. The catalyst component as claimed in claim 1, in which the said magnesium halide compound is magnesium chloride, the benzoate ester is an alkyl benzoate ester, and the titanium compound is titanium tetrachloride.

9. The catalyst component as claimed in any one of the preceding claims, in which the catalyst component is substantially free of the titanium compound removable by washing with an inert hydrocarbon.

10. The catalyst component as claimed in claim 1 in which titanium halogen compound is in solution, suspension or in liquid form.

11. The catalyst component as claimed in claim 1 in which said titanium halogen compound is a titanium halide.

* * * * *